Dec. 30, 1947.  B. W. FRY  2,433,689
COIN MECHANISM
Filed Nov. 8, 1944  6 Sheets-Sheet 1

Benjamin W. Fry,
Inventor
Haynes and Koenig
Attorneys.

Dec. 30, 1947.  B. W. FRY  2,433,689
COIN MECHANISM
Filed Nov. 8, 1944  6 Sheets-Sheet 2

Benjamin W. Fry,
Inventor,
Haynes and Koenig
Attorneys.

Dec. 30, 1947.　　　　B. W. FRY　　　　2,433,689
COIN MECHANISM
Filed Nov. 8, 1944　　　　6 Sheets-Sheet 3

Dec. 30, 1947.                B. W. FRY                 2,433,689
                           COIN MECHANISM
                       Filed Nov. 8, 1944         6 Sheets-Sheet 4

Benjamin W. Fry,
Inventor.
Haynes and Koenig
Attorneys.

Dec. 30, 1947.  B. W. FRY  2,433,689
COIN MECHANISM
Filed Nov. 8, 1944  6 Sheets-Sheet 5

Benjamin W. Fry,
Inventor.
Hayner and Koenig
Attorneys.

Dec. 30, 1947.                    B. W. FRY                    2,433,689
                              COIN MECHANISM
                     Filed Nov. 8, 1944          6 Sheets-Sheet 6
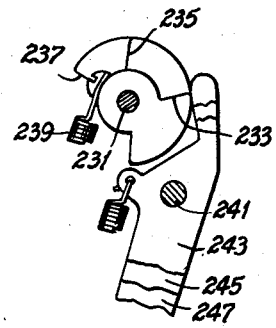
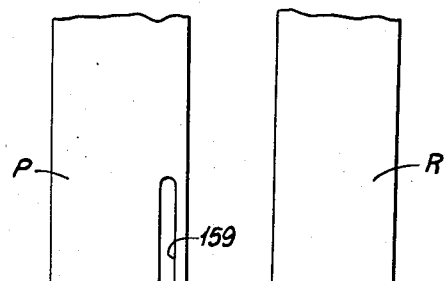
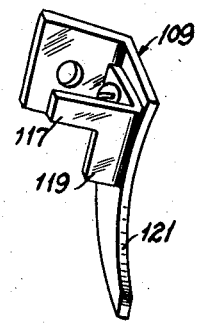
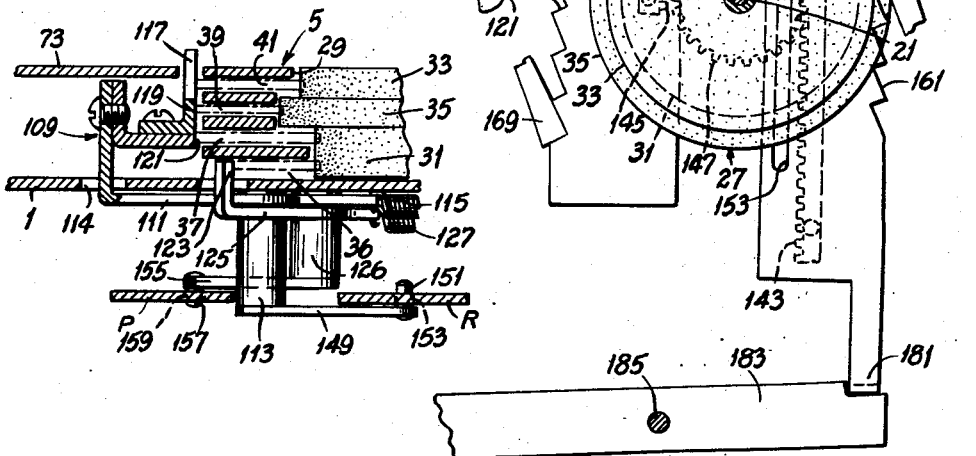
Benjamin W. Fry,
Inventor.
Hayner and Koenig
Attorneys Patented Dec. 30, 1947

2,433,689

UNITED STATES PATENT OFFICE 2,433,689

COIN MECHANISM

Benjamin W. Fry, Ladue, Mo., assignor to National Vendors Inc., St. Louis, Mo., a corporation of Missouri Application November 8, 1944, Serial No. 562,423

23 Claims. (Cl. 194—9)

This invention relates to coin mechanisms, and with regard to certain more specific features, to coin-operated control apparatus for use in connection with change-making vending or merchandising machines, amusement machines, phonographs and the like.

Among the several objects of the invention may be noted the provision of simplified coin apparatus which, in response to insertion of proper coins, will effect desired settings of certain control members required for dispensing and change-making operations of an associated machine; the provision of a mechanism of the class described in which are obtained additive displacement effects of said control members for making said settings, which effects are proportional to certain increments of value of various inserted coins; the provision of a device of the class described which without clogging will respond properly regardless of the rapidity with which coins are fed into it; the provision of a machine of the class described which will reject and return to the purchaser all coins above a predetermined amount whereby the change-making elements of said associated machine may be simplified because of its being relieved of functioning for unlimited values of inserted coins; the provision of a device of this class which if no delivery is made by the associated machine will return all inserted coins to the would-be purchaser but not until the present device has executed a complete cycle of operation and has therefore been reset for proper subsequent operation; and the provision of a machine of this class which may be made with a minimum number of close tolerances. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a side elevation of my new apparatus shown in association with a slug rejector and coin box, the rejector and box being shown in dotted lines;

Fig. 11 is a fragmentary view similar to parts of Fig. 4 showing certain elements in moved positions to illustrate a 5¢ registering operation just at completion;

Fig. 12 is an oblique section taken on line 12—12 of Fig. 11;

Fig. 13 is an isometric view of an operating shoe of Fig. 11; and,

Fig. 14 is a fragmentary section taken on line 14—14 of Fig. 5.

Similar reference characters indicate corresponding parts throughout the several views of the drawings.

In my U. S. patent application, Serial No. 391,907, filed May 5, 1941, for Vending machine, eventuated as Patent 2,377,413, dated June 5, 1945, is shown apparatus of the general type with which the present apparatus is useful, although changes in details would be necessary for specific adaptation thereto. In the apparatus of said patent an escapement type of switch-setting bar 45 is provided for moving certain switches D and E into positions where they may be acted upon by certain selector bars 47, 49, 51 or 53. The amount of movement of the escapement switch-setting bar is determined by the coins inserted.

In the present case two switch-setting bars are preferably used and they are operated by a smoother, faster operating and more reliable mechanism, avoiding the escapement principle of operation. The present device could be designed for use of one bar but the use of two bars allows for extending the functions of the type of merchandising machine shown in the patent and allows for coarser divisions of bar movement. By means of the two switch-setting bars, two groups of switches are used which will accommodate two groups of selector bars with which they cooperate. This considerably simplifies applications of the apparatus. Thus the invention allows the use of coarser step movements of each switch-setting bar and for the use of a wider range of coins. At the same time wider tolerances can be employed with the present mechanism instead of the finer ones ordinarily associated with adaptation to more coins.

In order to simplify the descriptions and drawings herein, neither switches D and E nor their equivalents have been shown herein on the switch-setting bars or shiftable means P and R. These bars P and R hereinafter will be discussed in detail. It is to be understood that instead of the switch-setting bars carrying control switches they might carry mechanical controls.

Figure 1:
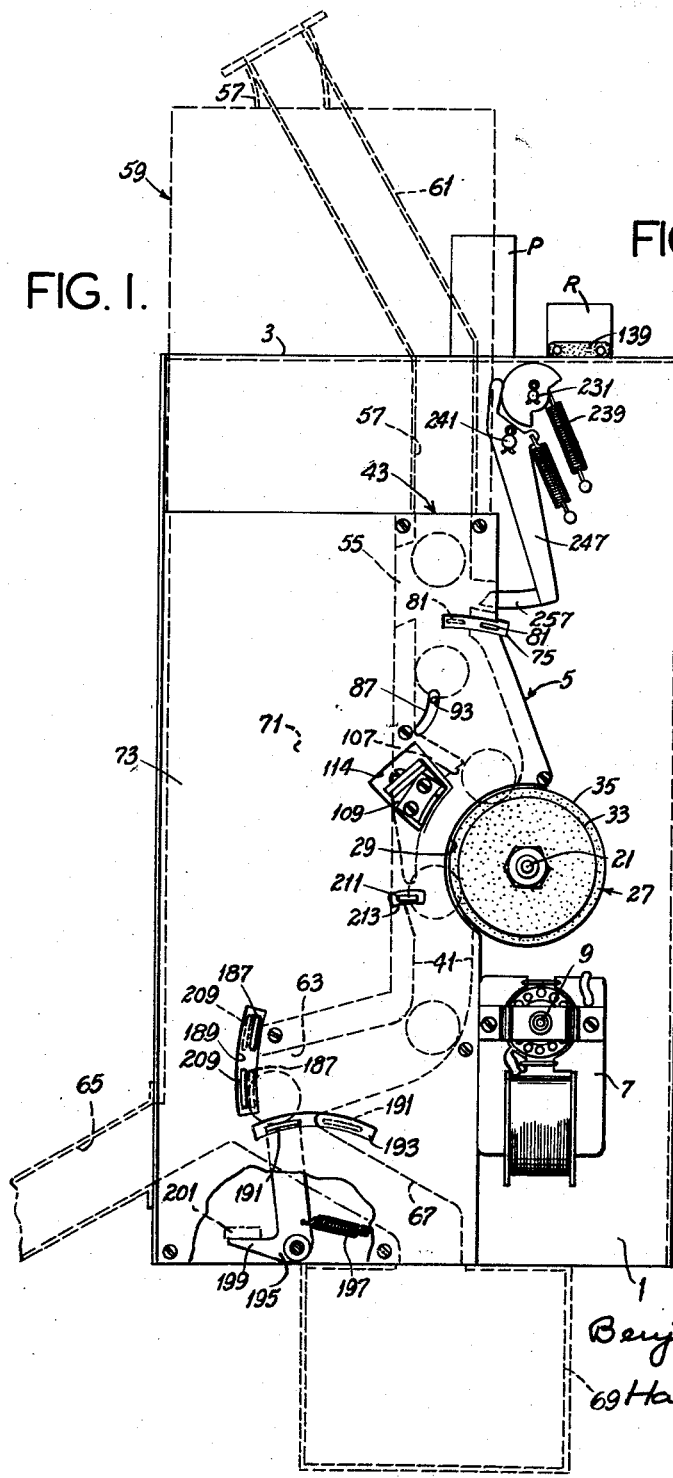
Figure 2:
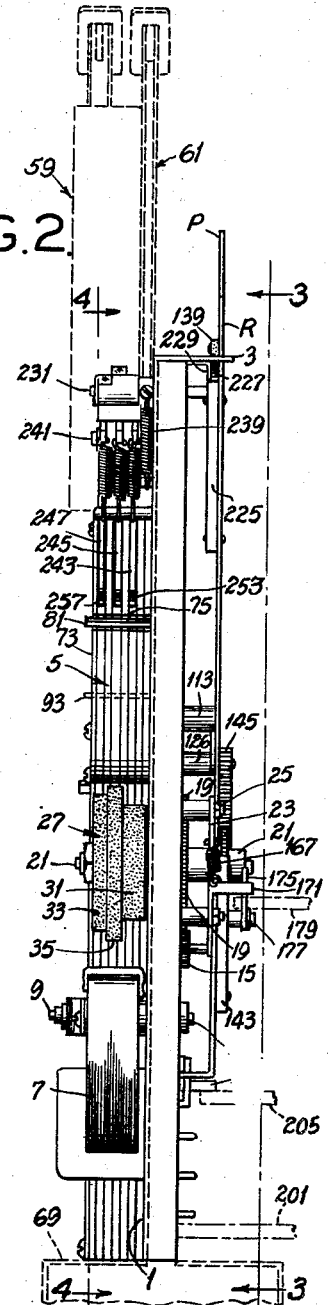
Fig. 2 is a right-side elevation of Fig. 1.
Figure 3:
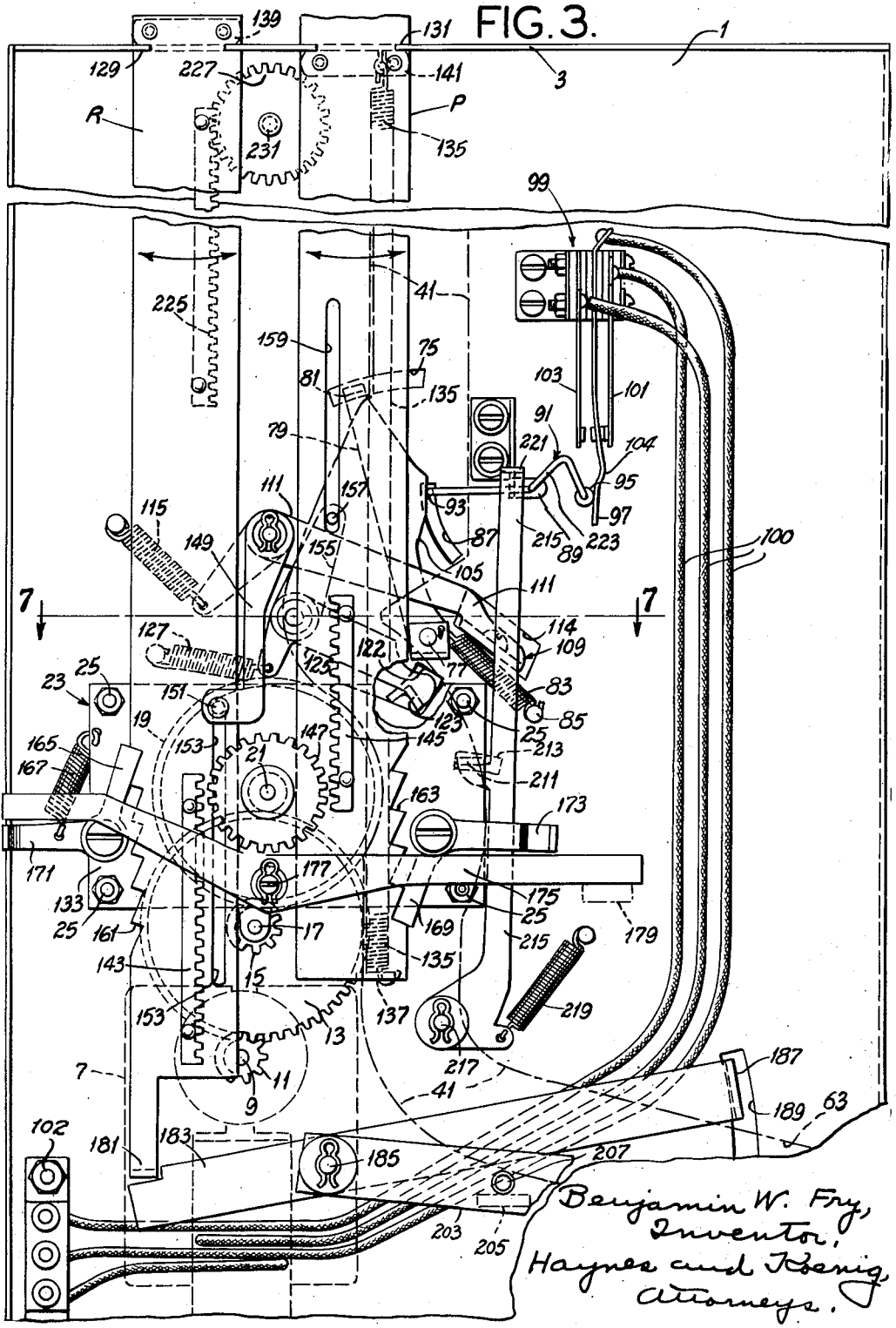
Fig. 3 is a rear elevation of Fig. 1 drawn on an enlarged scale but without the slug rejector and coin box, being viewed approximately from line 3—3 of Fig. 2.
Figure 4:
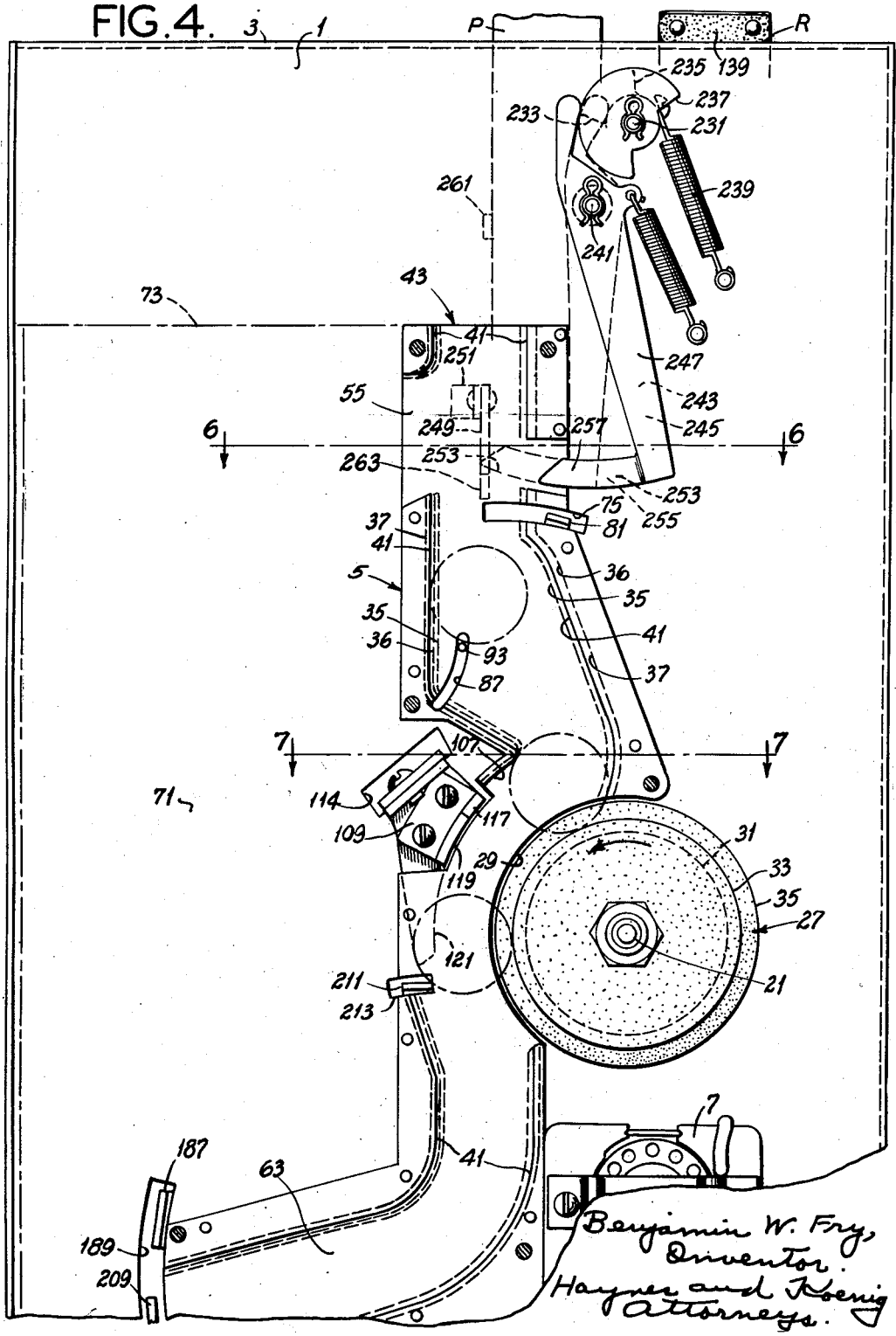
Fig. 4 is a partial front elevation on the scale of Fig. 3 but showing certain cover parts of Fig. 1 removed, and being viewed approximately on line 4—4 of Fig. 2.
Figure 5:
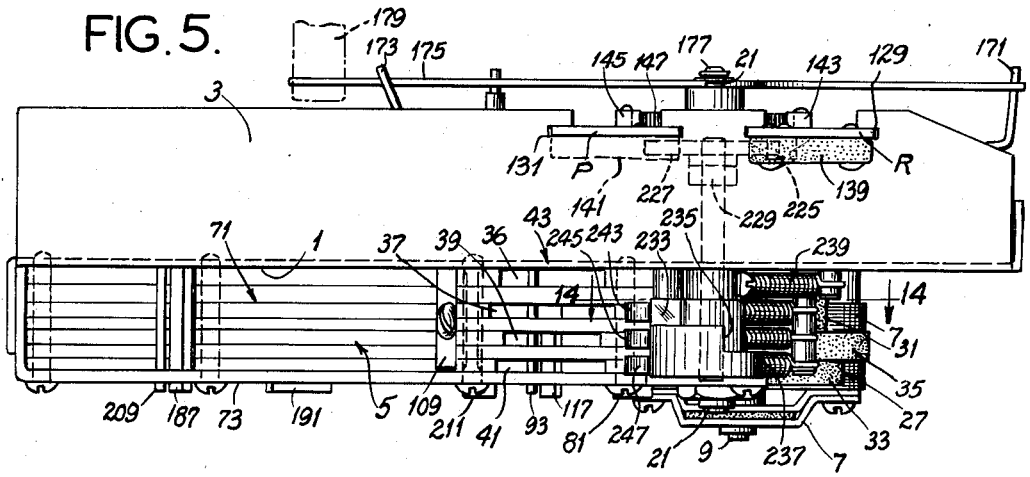
Fig. 5 is a top plan view of Fig. 4.

Referring now more particularly to Figs. 1 and 4, there is shown at numeral 1 a supporting plate which is flanged at its edges for stiffness. The most important flange from a functional viewpoint is indicated at 3. The front of the plate 1 supports a multiple coin-chute assembly indicated generally by numeral 5. Supported also on this plate 1 at the bottom and to the right of the coin-chute assembly 5 is a driving motor 7. The armature shaft 9 of this motor passes through the plate 1 to the rear where it is provided with a pinion 11 (Fig. 3). This pinion 11 drives a double-reduction gear train consisting of gear 13, pinion 15 (on one shaft 17), said pinion 15 driving a gear 19 on a main drive shaft 21. The shafts 17 and 21 are carried in a supporting frame 23, which by means of posts 25 is carried on the back of plate 1. The shaft 21 passes forward through the plate 1 where it carries a stepped resilient driving roll 27 located above the motor 7 (Figs. 1, 2, and 4-7).

The rubber roller 27 is nested in an arcuate edge portion 29 of the coin-chute assembly 5. The resilient (rubber or the like) roller has a three-step edge, the steps being indexed 31 (toward the plate 1), 33 (farthest from the plate) and 35 (intermediately). Hereinafter 31 will be called a 25¢—1¢ (or quarter-penny); 33 a 5¢ (or nickel) step; and 35 the 10¢ (or dime) step. The chute 5 carries 25¢, 10¢ and 5¢ coin passages 37, 39 and 41, respectively, in the planes of the steps 31, 35 and 33. In addition, the chute with the plate 1 forms a 1¢ chute 36 which is also in the plane of the step 31. The general contours of these passages are most obviously shown in Figs. 1 and 4. The inlets for these passages are at the top of the chute assembly 5, as indicated generally at 43 (see Fig. 5).

Just below and to the left of the inlets 43 are surplus coin outlets 55 (Figs. 1 and 4). Just above the inlets 43 are inlet passages 57 of a slug rejector mechanism, shown generally by dotted lines at 59 in Figs. 1 and 2 only. The slug rejector mechanism is of known form and is attached to the present apparatus for selecting and feeding properly inserted 25¢, 10¢ and 5¢ coins to the passages 37, 39 and 41, respectively. Penny (1¢) coins which are inserted into the present apparatus do not pass through this slug rejector 59 but go through a by-pass 61. However, the 1¢ pieces, while by-passing the slug rejector 59, enter the coin-chute assembly 5 in the separate passage 36.

The lower end of the chute assembly 5 has a general outlet 63. From this point, depending upon matters which will appear, the coins may pass either to a return chute 65 or to a branched coin box chute 67 into a coin box 69, the latter being shown in dotted lines only in Figs. 1 and 2. The upper surplus coin outlets 55 also communicate with the return coin chute 65 by way of a generally open space 71 between the plate 1 and a cover 73.

Figure 8:
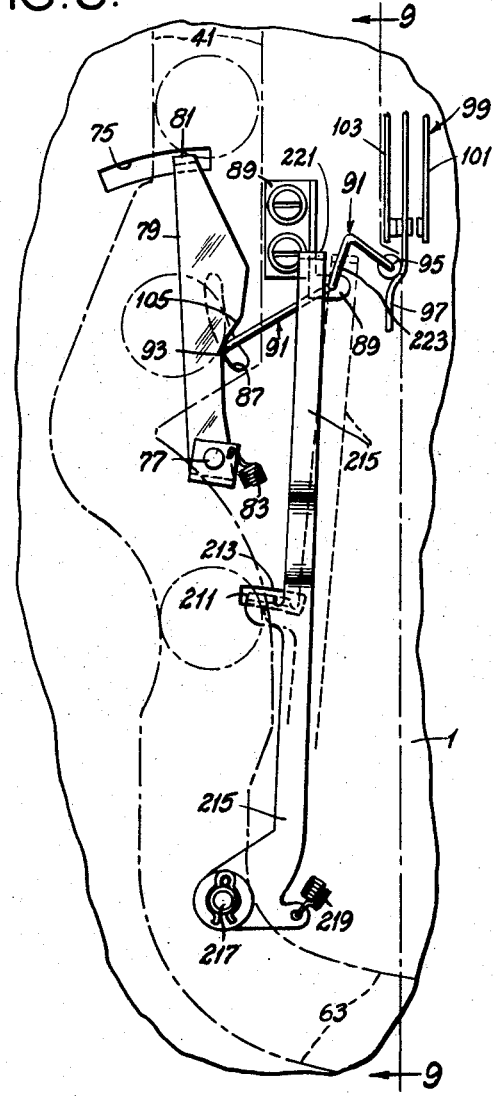
Fig. 8 is a fragmentary view of certain portions of Fig. 3 shown with moved positions in parts.
Figure 9:
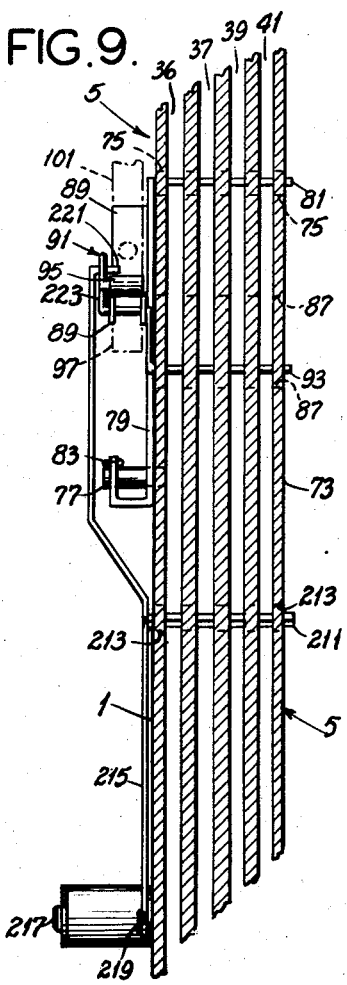
Fig. 9 is a vertical section taken on line 9—9 of Fig. 8.

All of the coin chutes 36, 37, 39 and 41 are traversed by an arcuate opening 75 cut in from the right-hand side of the coin chute 5 and passing also through the plate 1 as indicated in Fig. 8. On the center of the arc of this opening 75 is a pin 77 attached to the back of plate 1. This pin carries a lever 79 having a blocking finger 81 traversing the opening 75. At its lower end the lever is attached to a spring 83 which reacts from a pin 85 on plate 1 to bias the lever 79 from the Fig. 3 position to the Fig. 8 position. At numeral 87 is shown a second arcuate opening traversing all of the coin passages 36, 37, 39 and 41 and passing through plate 1. At the center of this arc on the back of plate 1 is a bearing 89 for a switch lever 91 (Fig. 8). This lever has a finger 93 extending through the opening 87 and movable along the opening. The other end of the switch lever carries an insulating roller 95 which contacts and moves a spring arm 97 of a single-pole, double-throw switch 99. Wires 100 feed this switch from plug 102. The two contacts of the switch are shown at 101 and 103. When the lever 91 is in the position shown in Fig. 3, the arm 97 springs closed with contact 101 due to action of a cam portion 104, bent into the spring arm 97. Since the reaction of arm 97 is over-centered with respect to the center of bearing 89, the sprung switch arm 91 tends lightly to maintain this position. When the arm 91 is in the coin-moved position shown in Fig. 8, the contact 103 closes due to roller 95 riding off from cam 104. The opening of contact 101 performs functions in the associated apparatus (not of direct interest herein). The closing of contact 103 closes the supply circuit for the motor 7.

Finger 93 cooperates with a cam 105 of lever 79 so that when arm 91 is depressed (Fig. 8), arm 79 is released to throw finger 81 into coin-blocking position. The lever 79 is swung back into clearing position of finger 81 (Figs. 3 and 4) whenever the switch arm 91 is up in the position such as shown in Fig. 3. In this position the finger 93 blocks the coin passages 36, 37, 39 and 41. Thus when a coin enters any of the passages 36, 37, 39 or 41, the finger 81 is normally in clearing position while the finger 93 is in intercepting position. The weight of the coin throws the finger 93 aside, thus closing the motor switch 97, 103 and allowing the finger 81 or lever 79 to move into intercepting position under action of spring 83. This is to prevent any additional coins that are quickly fed into the passages from advancing beyond the finger 81 until the coin that has passed it has caused the operating functions to be described. Then the finger 81 is returned to the clearing position of Fig. 3 and the finger 93 returns to the blocking position therein shown (see also Fig. 4). The mechanism for effecting this return includes a lever 215 (Fig. 8) which will be described later.

From the above it will be clear that as soon as a coin passes the finger 93, the resilient roller 27 rotates by reason of the energization of the motor 7. It moves counterclockwise (Fig. 4). The inserted coin (a 5¢ piece, for example, as indicated in dotted lines in Fig. 4) drops into engagement with the step 33 of the resilient roller 27. It rides upon a short track 107 against which it is pressed by friction from the roller. The coin is driven down this track 107 and into engagement with one element 117 of a multiple coin shoe 109.

The shoe 109 is shown per se in Fig. 13. It is carried on the end of a bellcrank lever 111 (Fig. 11) pivoted on pin 113 carried on plate 1. It passes through a slot 114 in the assembly 5 and is biased toward the roller 27 by a spring 115 (Figs. 3 and 11). The shoe 109 is operated by any of the 5¢, 10¢ or 25¢ coins which come down the respective passages 41, 39 and 37. It is not operated by any 1¢ coins coming through passage 36. Each 5¢, 10¢ or 25¢ coin in rolling past holds up the shoe 109 for a different period of time which is proportional to the purchasing value of the coin. For example, a 5¢ piece, which is shown as deflecting the shoe in Fig. 11, contacts with a short extension 117; the 10¢ coin contacts with a longer extension 119; and the 25¢ piece contacts with the longest extension 121. The 5¢ coin holds the shoe up a period of time which is one-fifth that of the time that the 25¢ piece holds up the shoe, and one-half the time that the 10¢ piece holds up the shoe. The 10¢ piece holds it up two-fifths of the time that it is held by the 25¢ piece. It will be understood that the 10¢ and 25¢ pieces are also driven by the roller 27 by reason of the proper step diameters of the roller (see 31 and 35). The 1¢ pieces do not operate the shoe 109 but operate a separate shoe 123 on a separate bellcrank lever 125 pivoted on a pin 126. This lever 125 extends through a slot 122 in plate 1 and is returned by means of spring 127. The purpose of these operations by the respective coins on the bellcrank levers 111 and 125 will appear.

Fig. 3 shows the rear of the plate 1 upon which these levers 111 and 125 are rotary mounted. Here it is shown that the upper edge flange 3 is T-notched at 129 and 131 (see also Fig. 5). In the head of notch 131 slides a shiftable switch-setting bar P and in the notch 129 slides a shiftable switch-setting bar R. P is the symbol for the 1¢ (penny) bar and R is the symbol for the bar which takes care of the remainder of the coins (25¢, 10¢ and 5¢). The flange 3 is thin enough that the bars P and R not only slide in their notches but may rock laterally in their own planes, that is, in the plane of the paper as viewed in Fig. 3. The double-headed arrows indicate this. The centers of swing are respectively approximately at the centers of the slots 129 and 131, regardless of the longitudinal positions of the bars. Both bars at their lower ends slide on the outer plate 133 of the gear-supporting frame 23.

Bar P is biased upward by a spring 135. Spring 135 is fastened to the bar P at the lower end as indicated at 137. A resilient stop 141 limits its upward motion by engagement with the flange 3. Bar R is biased down by gravity. A resilient stop 139 on bar R limits the downward motion by engagement with the flange 3. Bar R carries a toothed rack 143 and bar P carries a toothed rack 145. Carried on the main driving shaft 21, on the outside of the frame 23, is a driving gear 147 with which the racks 143 and 145 may engage when the bars R and P respectively swing inward toward the gear 147. It will be recalled that the shaft 21 is driven through the train of gears 11, 13, 15, 19 from the motor 7. Gear 147 is behind plate 1 and outside of frame 23.

The function of the bellcranks 111 and 125 is, in response to passage of coins, alternatively to move the bars R and P inward toward the gear 147. In the case of lever 111 and bar R, this is done by means of an extra arm 149 associated with lever 111 which carries a pin 151 cooperating with a slot 153 in the bar R. Thus when the lever 111 is moved counterclockwise by means of a passing coin (Fig. 3), the pin 151 moves in a direction to swing the bar R so that its rack 143 meshes with the gear 147. The gear 147 is at this time moving by reason of the fact that the coin which caused movement of lever 111 has engaged finger 93 and closed switch 97, 103 to energize the motor 7. This condition of affairs is illustrated in Fig. 11 wherein bar R is being driven upward in response to action of a 5¢ piece on shoe 109 as the 5¢ piece is driven by the roller 27. The time that the 5¢ piece holds the shoe 109 out determines the time of engagement between the rack 143 and the gear 147 and thus the amount that the bar R will rise. As soon as the coin moves from under the shoe 109, the shoe returns under action of spring 115 which also causes return of the bellcrank 111. Hence through arm 149 and pin 151 the bar R is caused to be swung out so that its rack 143 disengages from the gear 147. The slot 153 also allows the necessary relative movement between the bar R and pin 151.

If a 10¢ piece actuates the shoe 109, the engagement between the rack 143 and the gear 147 will be twice as long as the engagement for a 5¢ piece. If a 25¢ piece actuates the shoe 109 the engagement between the rack 143 and the gear 147 will be five times as long as the engagement for a 5¢ piece.

Pennies do not affect engagement of the rack 143, since they do not control shoe 109. They control shoe 123 and hence bellcrank 125. As indicated in Figs. 3 and 11, this bellcrank includes a second arm 155 which carries pin 157 operating in slot 159 of the bar P. Thus when the step portion 31 of the roller 27 drives the 1¢ piece to force out the 1¢ shoe 123, the lever 155 is driven clockwise (Fig. 11), thus rocking the bar P so that its rack 145 swings into mesh with the gear 147.

The bar R is provided on its edge with five ratchet teeth 161 and the bar P is provided with four ratchet teeth 163. For each 5¢-controlled interval that the rack 143 is driven up by gear 147, the space occupied by one ratchet tooth 161 is moved. For each 1¢-controlled interval that the rack 145 is driven up by gear 147, the space between adjacent ratchet teeth 163 is moved. Thus in the case of bar R, when the rack 143 is unmeshed from gear 147 by the action of spring 115 (after passage of a coin from under shoe 109), a pawl 165 is caused to hook in under the proper one of the ratchet teeth 161 to hold the bar R in its raised position. Spring 167 normally biases the pawl 165 into engaging position. However, the spring 165 is not strong enough alone to cause the pawl 165 to shift the rack 143 of bar R into engagement with the gear 147.

Likewise, a pawl 169 is caused to engage the ratchet teeth 163 of the bar P, being gravity held in the engaging position. In this case also the bias of the pawl 169 is not enough alone to cause engagement between rack 145 and gear 147.

The pawl 165 includes an arm 171 and the pawl 169 includes an arm 173. A common rocker 175 pivoted at 177 is engageable with bent portions of the arms 171 and 173 to swing the pawls 165 and 169 out of engagement when desired so that the bars R and P may at will be allowed to return to their initial positions shown in Fig. 3. This rocker 175 is engaged by a lug 179 extending from the apparatus with which this mechanism is associated. When the proper time comes for returning the present mechanism to its starting position, the lug 179 effects the return through the rocker 175. For example, the package delivery of said patent, which is the last event in a purchasing cycle, may cause this lug 179 to operate the rocker 175 and clear the present mechanism back to its starting position as shown in Fig. 3.

Movement of the bar R upward performs another operation, that is, its lower end 181 moves out of engagement with the left-hand end of another rocker 183 pivoted at 185. This rocker 183 has a finger 187 reaching through an arcuate slot 189 in the plate 1. Thus when the bar R rises, the rocker 183 moves (clockwise, Fig. 3; counterclockwise, Fig. 1) so that the finger 187 moves from its raised solid-line position (Fig. 1) to its lower dotted-line position. In its lower dotted-line position it blocks the outlet 63. Thus no coin can be passed to the return chute 65 until the bar R is returned to the starting or clearing position of the machine.

In order to control the coin at the outlet 63 in respect to the coin box chute 67, another finger 191 is employed which swings in an arcuate slot 193 in the plate 1. This finger 191 is on a bellcrank 195 which by means of a spring 197 is biased to its dotted-line clearing position. It carries a finger 199 which is engaged by a lug 201 extending from the merchandising apparatus with which the present device is associated. The finger 191 is held in its solid-line, intercepting position by this associated mechanism. As soon as the delivery mechanism of this merchandising mechanism goes into operation, the interceptor 191 is permitted temporarily to move to its dotted-line position, thus allowing coins to go to the coin box.

Another lever 203 pivoted at 185 is also under the influence of a function of the merchandising machine through a lug 205 extending from the latter and engaging a pin 207 on said lever 203. This lever 203 carries a finger 209 which is normally in its solid-line intercepting position shown in Fig. 1. When the operator of the merchandising machine pushes a lever for return of coins, as upon an incomplete purchase, the lug 205 raises pin 207 and hence raises the finger 209 to its dotted-line position shown in Fig. 1, which allows coins to move to the return chute 65, provided finger 187 is up in its clearing position and finger 191 is in its intercepting position over chute 67.

A further description of the apparatus responsible for the coordinated activities of the lugs 205 and 201 will not be given because the pertinent scheme is obtainable from the named patent. Mention is made here of the matter simply for completeness.

It will now be described how the fingers 81 and 93 are returned from their positions shown in Fig. 3 to that shown in Fig. 4. This is accomplished by means of a finger 211 extending through an arcuate slot 213 intercepting all of the coin passages 36, 37, 39 and 41 and the plate 1. This finger 211 is carried upon a lever 215 which is pivoted at 217 to the back of plate 1. This lever is biased by a spring 219 to the position shown in full lines in Fig. 8 wherein the finger 211 is in position to be contacted by any one of the coins traversing passages 36, 37, 39 and 41 under driving action of the roller 27. Since the finger 211 is beneath the shoes 109 and 123 it will not actuate the lever 215 until all of the operations associated with moving the bars R and P have been completed. When the finger 211 is contacted by a driven coin the lever 215 moves to a dotted-line position shown in Fig. 8. This causes a finger 221 on its end to contact a segment 223 of the switch lever 91 so as to return it from the position shown in Fig. 8 to the starting position shown in Fig. 3. This of course reopens the motor switch 97, 103, recloses the switch 97, 101 (which has functions in connection with the associated merchandising machine). It resets the finger 93 to its intercepting position shown in Fig. 4 and also resets the finger 81 to its non-intercepting position shown in said Fig. 4.

On the back of the bar R, near its upper end, is carried an upper second rack 225, which at all times meshes with a gear 227 supported upon a bearing 229 in the plate 1. The shaft 231 of this gear reaches to the front of the plate 1 (Fig. 4) where it carries three cams 233, 235 and 237. The cam 233 is in the plane of the 25¢ coin passage; the cam 235 is in the plane of the 10¢ coin passage; and the cam 237 is in the plane of the 5¢ coin passage. A spring 239 is used to take up backlash between the gear 227 and the rack 225 caused by the slight amount of movement between these two members. It is to be understood, however, that they do not ever disengage, since the amount of swinging movement of bar R around the center in T-slot 129 is small, close to this center.

Pivoted on a pin 241 beneath the cams are three rockers 243, 245 and 247 which have engaging fingers on the respective cams (Figs. 4 and 14). That is, the finger of rocker 243 engages cam 233; the finger of rocker 245 engages cam 235; and the finger of rocker 247 engages the cam 237. Rockers 243, 245 and 247 carry throw-out fingers 253, 255 and 257, respectively. These reach into the coin passages 37, 39 and 41, respectively. When the bar R moves up an amount brought about by the passage past the shoe 109 of a 5¢ piece, the cam shaft 229 rotates an amount to permit the finger 253 of inner lever 243 to move into the dotted-line position shown in Fig. 4, intercepting the 25¢ coin passage 37. Thus after 5¢ has entered and registered in the apparatus by movement of bar R, it is impossible to insert another 25¢ piece without its being rejected and returned. It by-passes out of the outlet 55 to the coin return passage 65 via space 71. The same effect would be obtained and remain unaltered by inserting a 10¢ piece; two 5¢ pieces; three 5¢ pieces; or the combination of a 10¢ and a 5¢ piece (in their respective passages of course).

If, after having inserted 15¢ by three 5¢ pieces or a 10¢ piece and a 5¢ piece, another 5¢ piece is inserted, the second cam 235 will have been rotated an amount to allow rocker 245 to send its finger 255 into the 10¢ slot so that both the 25¢ passage and the 10¢ passage are now blocked to by-pass coins. Thus all amounts are returned which would move the bar R in excess of the distance corresponding to the action for 25¢. This will admit of insertion of another 5¢ piece, which brings the outer cam 237 into position to allow rocking of the outer arm 247 and insertion of its finger 257 into the 5¢ coin passage. At this time all of the 5¢, 10¢ and 25¢ passages are blocked so that no further coin except 1¢ pieces can be inserted into the inlet 43, without rejection through the outlet 55.

Figure 6:
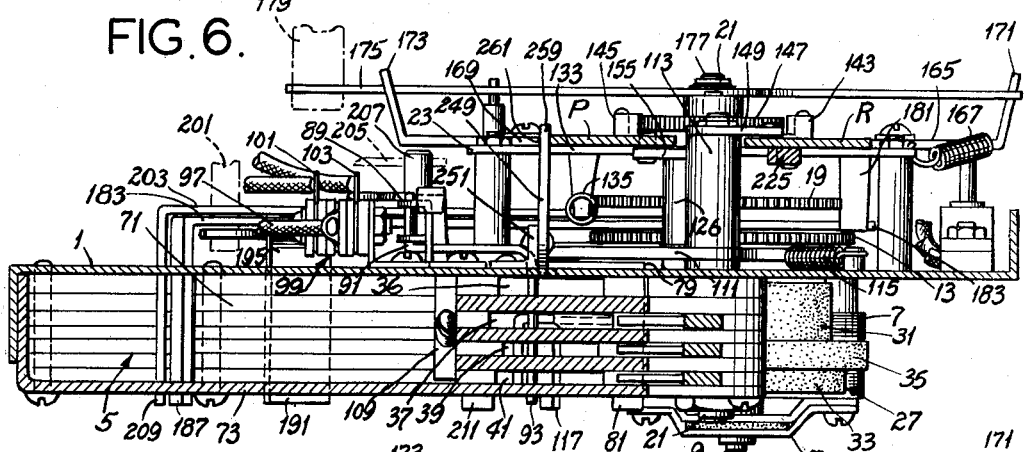
Fig. 6 is a horizontal section taken on line 6—6 of Fig. 4.
Figure 7:
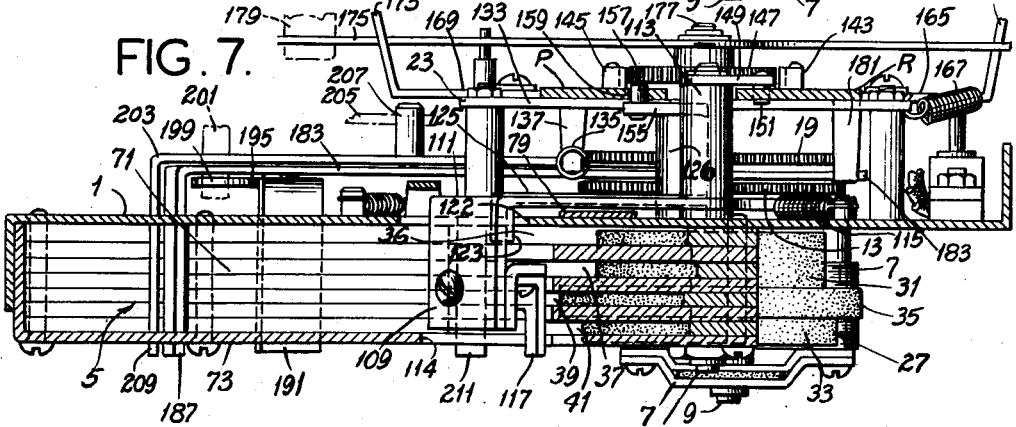
Fig. 7 is a horizontal section taken on line 7—7 of Figs. 3 and 4.
Figure 10:
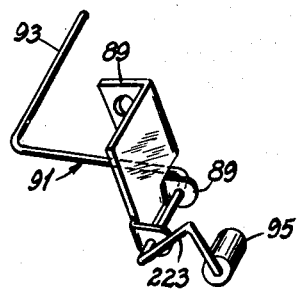
Fig. 10 is an isometric view of a control lever otherwise shown orthographically in Figs. 3 and 8.

It is intended to admit four additional 1¢ coins without rejection, until the total amount receivable by the machine for one purchase, without rejection, shall be 29¢. This is accomplished by having a penny rejector bellcrank 249 pivoted on a bracket 251 (Figs. 4 and 6). This bellcrank has an arm 259 adapted to be contacted by a lug 261 on the penny bar P when the latter has descended an amount corresponding to the insertion of four 1¢ coins. The bellcrank carries a finger 263 which is caused to intercept the 1¢ passage 36 when the finger 259 is contacted by the lug 261. Thus after the bar P has been moved an amount corresponding to four 1¢ coins, any more introduced are returned.

It is to be understood that, although the limit of the value of coins that will pass through the illustrated apparatus without rejection is 29¢, this limit may be varied by adjustments of cams 233, 235 and 237, the number of ratchet teeth 161, 163 on the bars R and P respectively, and the location of the lug 261 on the bar P. This might require change in the lengths of the bars and the racks thereon. The value of 29¢ selected for illustration is merely exemplary.

Operation is as follows:

The maximum coin value to be received by the apparatus in order to effect one purchasing transaction is 29¢. Assume that a 25¢ piece is inserted into the 25¢ passage 37. This first contacts what may be called the primary interceptor finger 93, throwing it aside. This causes the switch 97, 103 to close and to start the motor 7 so as to drive the resilient roller 27. At the same time, release of lever 79 by the interceptor finger 93 throws what may be called the secondary interceptor finger 81 into intercepting position across all passages so as temporarily to intercept any additional coins which might jam operations. The 25¢ piece then rolls against the rotating roller 27 which drives it over and from the track 107 against the arcuate surface 121 of the intercepting shoe 109. The shoe is thus held out for five intervals of time corresponding to the five 5¢ values in the 25¢ piece. This swings the bellcrank lever 111 against the bias of spring 115. Arm 149 of said lever also swings so that pin 151 swings the bar R so as to engage the rack 143 with the rotating gear 147. It will be recalled that gear 147 is at this time being driven with the roller 27. Thus the bar R is driven up a distance proportional to the time of engagement of the rack 143 along with the gear 147. The length of the shoe 121 determines when the rack 143 unmeshes from gear 147. At the end of the travel of the bar R, it is held in its displaced position by means of the pawl 165 engaging the fifth tooth of the rack of the ratchet 161. Furthermore, the upper rack 225 has by this time driven the gear 227 so that the cams 233, 235 and 237 are rotated as a unit to a position wherein the rockers cause their fingers 253, 255 and 257 to enter the passages 37, 39 and 41. These kick out any subsequently inserted 5¢, 10¢ or 25¢ pieces out of the outlet 55. Any subsequently inserted coin, it will be recalled, is resting upon the secondary interceptor finger 81.

At the end of the time of movement of bar R the 25¢ coin leaves the track 121 of shoe 109 and drops down into driving engagement with the intercepting finger 211 which, as has already been made clear, returns the primary interceptor fingers 93 and 81 to their normal positions, ready to receive additional coins. However, the device is not ready to receive another 5¢, 10¢ or 25¢ piece until the device is cleared to starting position. This is accomplished by rotation of the rocker 175 from the lug 179 of the cooperating machine (or otherwise) which by releasing the pawls 165 and 169 causes the bar R to be returned by gravity to starting position.

It will be seen that if at this time the shiftable means or registry bar R has run up to its 25¢ displaced position as determined by the insertion of a 25¢ piece, all other coins inserted into passages 39 and 41 will be deflected out of the openings 55. This does not apply to any 1¢ pieces inserted into passage 36 until four of them have been inserted. For example, if four 1¢ pieces are inserted in this passage and pass out from beneath the finger 211, the shiftable registry bar P is depressed a distance proportional to the distance four times the distance that it is depressed for the passage of a 1¢ piece. After the fourth 1¢ piece has been inserted the lug 261 causes the finger 263 to move into intercepting position and thereafter deflect all subsequently inserted 1¢ pieces. The fingers 93 and 81 act the same in reference to 1¢ pieces as they do to 5¢, 10¢ and 25¢ pieces.

The detailed operation for the passage of a 1¢ piece through the apparatus below the deflector 263, if accepted, will not be necessary since it is similar to the operation of a 25¢ coin, except that it operates to mesh rack 145 with gear 147 through the operation of shoe 123, lever 155 and pin 157.

Inserted 10¢ pieces and 5¢ pieces operate bar R through action of shoe 109. The 10¢ piece engages portion 119 and the 5¢ piece engages portion 117. However, it will be noted that no 10¢ piece or 5¢ piece can be inserted without being deflected through the opening 55 after a 25¢ piece has been inserted.

Assuming next that no 25¢ piece has been inserted, insertion of two 10¢ pieces in the 10¢ passage 39 will result in two fingers 253 and 255 being moved into intercepting position in passages 39 and 41, respectively. In other words, at this time an additional 10¢ piece or an additional 25¢ piece may not be inserted without being injected out of the openings 55. However, an additional 5¢ piece could be inserted into the opening of passage 41 after which the finger 257 would move into intercepting position in the passage 41. Thus 25¢ made up of two 10¢ pieces and one 5¢ piece also prevents acceptance of any more coins except 1¢ pieces.

Next, suppose that no 25¢ or 10¢ piece has been inserted and that 5¢ pieces are inserted one after the other into passage 41. When the first 5¢ piece passes through, the finger 253 moves into intercepting position in the 25¢ passage 37. The insertion of two more 5¢ pieces will result in no additional operation of any finger 253, 255 or 257. The same would be true if a 10¢ piece were inserted into passage 39 following insertion of the first 5¢ piece. If after inserting three 5c pieces, or one 5¢ piece and a 10¢ piece, an attempt is made to insert an additional 25¢ piece, it will be rejected out of opening 55. However, insertion of another 10¢ piece in addition to three 5¢ pieces or a 5¢ piece plus a 10¢ piece, would be accepted because of the absence of finger 255 from the 10¢ passage 39.

Returning now to the situation wherein no 25¢ piece or 10¢ piece has been inserted into the passages 37 and 39, respectively (after insertion of three 5¢ pieces into the 5¢ passage 41), a fourth 5¢ piece inserted into the latter passage will cause the finger 255 to move into the 10¢ passage 39, thus precluding insertion without ejection thereafter of both additional 25¢ and 10¢ pieces. Thus only a fifth 5¢ piece will be admitted into the 5¢ passage 41 before the finger 257 moves into the 5¢ passage 41, thereby precluding the insertion of any more coins at all (with the exception of pennies in the passage 36). In other words, as to any one passage or the passages 37, 39 and 41 taken as a group, operations according to each accumulated coin value result in throwing one or more deflectors into such passages as will cut out the insertion of an amount of coins that would carry the maximum value above a predetermined amount.

Thus, should the user insert any coin in any one of passages 37, 39 or 41 which would bring the total value of coins inserted over 25¢, that coin will be rejected and returned via chute 65. Hence the highest amount of 5¢, 10¢ and 25¢ coins that the machine will receive for actuation of the register bar R is of the value 25¢. Likewise, the maximum number of 1¢ pieces that may reach the roller 27 for moving the register bar P to a given cycle is 4¢. Therefore the grand total that the machine will receive for moving both registry bars P and R throughout a complete registering cycle is 29¢. As elsewhere indicated herein, these values may be changed by suitable adjustments and/or redesign.

It is to be understood that the present machine is not a change-making machine but is an adjunct to the change-making apparatus forming a part of the associated merchandising apparatus such as shown in said patent. For example, if a 25¢ piece is inserted into the present machine for a 15¢ purchase, the 25¢ piece will be accepted by this apparatus. Then the registration position of the switches or other controls (not shown) but carried by the bars R and P will be such in relation to the selector bars in the merchandising machine as will set up the necessary functions for return from the change-maker of the necessary 10¢ change. Said patent makes clear how these functions are brought about. As above stated, to simplify the description and drawings, the switches that might be carried upon the bars P and R in order to coordinate with the apparatus such as shown in said first-named patent have been omitted, along with the wiring that would be required therefor.

The purpose of rejecting amounts more than 29¢ in the present apparatus is that such a value will cover all costs of merchandise to be bought from the adapted merchandising machine and avoids the necessity for increasing the complexity of the change-making apparatus in the associated vending machine which would be necessary if a limit were not placed upon the money inserted. Sabotaging of the machine by jamming it with an excess number of quickly applied coins cannot occur.

While 1¢, 5¢, 10¢ and 25¢ coin denominations have been indicated, others of a lesser or greater number may be employed within the principles of the invention.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Coin-controlled apparatus comprising means forming a coin chute, driving means associated with a portion of the chute adapted positive'y to drive coins along a portion of the chute, a driving motor for said driving means, the circuit of said motor being normally deenergized, a switch in said circuit, a primary interceptor in the chute ahead of said driving means responsive to movements towards the driving means of a coin in the chute and adapted to close said switch, a secondary interceptor ahead of said primary interceptor movable to a position to block passage toward the driving means of additional coins, and a third interceptor adjacent the driving means adapted to be deflected by a coin which is being driven by the driving means and to return said primary and secondary interceptors to their initial positions wherein the primary interceptor is ready for response to the next coin and the secondary interceptor will admit it, movement of said primary interceptor to its initial position reopening said switch.

2. Coin-controlled apparatus comprising means forming a coin chute positioned for gravitational movement therethrough of coins, a frictional driving wheel associated with a portion of the chute adapted positively to drive coins along said portion of a chute, a driving motor for said wheel the circuit of which is normally deenergized, a switch in said circuit, a primary interceptor in the chute ahead of said wheel responsive to movements of a coin in a chute towards the wheel and adapted to close said switch, a secondary interceptor ahead of said primary interceptor movable to a position to block passage toward the wheel of additional coins, and a third interceptor adjacent the wheel adapted to be deflected by a coin which is being driven by the wheel and to return said primary and secondary interceptors to their initial positions wherein the primary interceptor is ready for response to the next coin and the secondary interceptor admits it, movement of said primary interceptor to its initial position reopening said switch.

3. Coin-controlled apparatus comprising means forming a coin chute positioned for gravitational movement therethrough of coins, a frictional driving wheel associated with a portion of the chute adapted positively to drive coins a'ong said portion of a chute, a driving motor for said wheel the circuit of which is normally deenergized, a switch in said circuit, a primary interceptor in the chute ahead of said wheel responsive to movements of a coin in the chute towards the wheel and adapted to close said switch, a secondary interceptor ahead of said primary interceptor movable to a position to block passage towards the wheel of additional coins, a third interceptor adjacent the wheel adapted to be deflected by a coin which is being driven by the wheel and to return said primary and secondary interceptors to their initial positions wherein the primary interceptor is ready for response to the next coin and the secondary interceptor will admit it, movement of said primary interceptor to its initial position reopening said switch, and registering means having an extension in said chute adjacent said wheel but ahead of the said third interceptor and responsive to movement of a coin by the wheel to effect registering action during the time that the wheel is driven by the motor.

4. Coin-controlled apparatus comprising means forming a coin chute, a driving wheel associated with a portion of the chute adapted positively to drive coins along a portion of a chute, a driving motor for said wheel the circuit of which is normally deenergized, a switch in said circuit, a primary interceptor in the chute ahead of said wheel responsive to movements of a coin in the chute towards the wheel and adapted to close said switch, a secondary interceptor ahead of said primary interceptor movable to a position to block passage toward the wheel of additional coins, a third interceptor adjacent the wheel adapted to be deflected by a coin which is being driven by the wheel and to return said primary and secondary interceptors to their initial positions wherein the primary interceptor is ready for response to the next coin and the secondary interceptor will admit it, movement of said primary interceptor to its initial position reopening said switch, registering means having means intercepting said chute adjacent said wheel but ahead of the said third interceptor and responsive to movement of a coin by the wheel to effect a registration during the time that the wheel is driven by the motor, and ejecting means located in association with the chute ahead of said secondary interceptor and adapted to be operated by said registering means after certain coins have passed through the chute.

5. Coin-controlled apparatus comprising means forming a coin chute, coin-driving means associated with said chute adapted to drive a coin through a portion of a chute, a motor for driving said driving means, a motor switch, means responsive to movement of a coin through the chute towards said driving means adapted to close said switch to start the motor, means responsive to movement of the coin thereafter to open said switch and to stop said motor, a gear driven by the motor, a rack bar adapted for a longitudinal movement by and some swinging movement to and from mesh with the gear, and means intersecting the chute near said driving means and being actuable by a coin driven by the driving means adapted to swing the rack bar into mesh with said gear for a predetermined period of time as determined by the length of time during which the intersecting means is actuated by a coin.

6. Coin-controlled apparatus comprising means forming a coin chute, positive coin-driving means associated with said chute adapted positively to drive a coin through a portion of a chute, a motor for driving said positive means, a motor switch, first means responsive to movement of a coin through the chute towards said positive means to close the motor switch to start the motor, second means responsive to movement of the coin thereafter to open said switch and to stop said motor, a gear driven by the motor during movement of the coin from said first to said second means, a rack bar adapted for longitudinal movement and also swinging movement to and from mesh with the gear, and means intersecting the chute near said positive driving means and being responsive to positive movement of a coin in connection with the driving means adapted to swing the rack bar into mesh with said gear for a predetermined period of time as determined by the time during which the intersecting means is responsive to positive movement of a coin.

7. Coin-controlled apparatus comprising means forming a coin chute, a coin-driving wheel associated with said chute adapted positively to drive a coin through a portion of a chute, a motor for driving said wheel, a motor switch, means responsive to movement of a coin through the chute towards said wheel to close said switch and to start the motor, means responsive to movement of the coin thereafter to open said switch and to stop said motor, a gear driven by the motor in accordance with the wheel, a rack bar adapted for a longitudinal movement and some swinging movement to and from mesh with the gear, a movable shoe intersecting the chute near said coin-driving wheel and being responsive to positive movement of a coin, link means connecting the shoe and the rack bar adapted to swing the rack bar into mesh with said gear for a period proportional to the operation of the shoe by the coin, means for returning said shoe and link means to unmesh the rack bar from said gear, and means for temporari'y maintaining the displaced position of the rack bar after said unmeshing.

8. Coin-controlled apparatus comprising means forming a coin chute, coin-driving means associated with said chute adapted positively to drive a coin through a portion of a chute, a motor for driving said positive drive means, a motor switch, means responsive to movement of a coin through the chute towards said positive means to close said switch and to start the motor, means responsive to movement of the coin thereafter to open said switch and to stop said motor, a gear driven by the motor, a registering rack bar adapted for a longitudinal movement and some swinging movement to and from mesh with the gear, a movable shoe intersecting the chute near said positive driving means and being responsive to movement of a coin, link means connecting the shoe and rack bar and including a swinging pin, a slot in the bar permitting bar movement and effecting a connection to bring about said swinging movement to move the rack bar into mesh with said gear for a predetermined period of the positive motion of the coin, return means for unmeshing the rack bar at the end of the drive of the shoe by the coin, ratchet and pawl means associated with the rack bar for holding it in its displaced position, and means for returning the rack bar to its starting position when unmeshed and independently of said shoe and linkage.

9. Coin-controlled apparatus comprising means forming a multiple coin chute, multi-plane coin-driving means associated with said multiple coin chute adapted positively to drive any coin in any chute, a motor for driving said positive means, a motor switch, a first means responsive to movement of any coin towards the positive means to close said switch and to start the motor, a second means responsive to movement of said last-named coin thereafter to open said switch and to stop said motor, a gear driven by the motor during movement of a coin from said first to said second means, a rack bar adapted for longitudinal movement by and some swinging movement to and from mesh with the gear, means intersecting the multiple coin chute near said positive driving means and being responsive to positive movement of any coin in connection with the driving means adapted temporarily to swing the rack bar into mesh with said gear for a predetermined period of positive longitudinal motion of the rack bar, a second gear, a second rack on the bar permanently meshed with said second gear, and means driven by said second gear for selectively blocking passage of coins to the multiple coin chute.

10. Coin - controlled apparatus comprising means forming a coin chute, a driving wheel associated with a portion of the chute adapted positively to drive coins along a portion of the chute, a driving motor for said wheel the circuit of which is normally deenergized, a switch in said circuit, a primary interceptor in the chute ahead of said wheel responsive to movements of a coin in the chute towards the wheel and adapted to close said switch to energize the motor, a second interceptor ahead of said primary interceptor movable to a position to block passage towards the wheel of additional coins, a third interceptor adjacent the wheel adapted to be deflected by a coin which is being driven by the wheel and to return said primary and second interceptors to their initial positions, movable means having a part intercepting said chute adjacent said wheel but ahead of said third interceptor and responsive to motion of a coin by the wheel to effect a movement, and ejecting means located in association with the chute ahead of said second interceptor and adapted to be operated by said movable means after certain coins have passed through the chute.

11. Coin-controlled apparatus comprising means forming a multiple coin chute, a driving wheel associated with a portion of the chute adapted positively to drive various coins along respective portions of the multiple chute, a driving motor for said wheel the circuit of which is normally deenergized, a switch in said circuit, a primary interceptor in the multiple chute ahead of said wheel responsive to movements of any coin in the multiple chute towards the wheel and adapted to close said switch to energize the motor, a second interceptor in the multiple chute ahead of said primary interceptor movable to a position to block passage towards the wheel of any additional coins, a third interceptor in the multiple chute adjacent the wheel adapted to be deflected by any coin which is being driven by the wheel and to return said primary and second interceptors to their initial positions, movable means having a part intercepting said multiple chute adjacent said wheel but ahead of said third interceptor and responsive to motion of a coin by the wheel to effect a movement, and respective ejecting means located in association with the respective portions of the multiple chute and located ahead of said second interceptor and adapted successively to be operated by said movable means as certain coins pass through the chute.

12. Coin apparatus comprising means providing several passages for receiving coins, said passages respectively having inlets, coin-driving means spaced from the inlets for driving through each respective passage a coin, means responsive to initial movement of a coin in any passage to start the coin-driving means, individual coin deflectors for the respective passages ahead of said coin-driving means, an auxiliary driver movable with the coin-driving means, shiftable means movable into engagement with the auxiliary driver to be driven and shifted but being normally disengaged from said driver, coin-responsive means actuated by any coin traversing any passage, said coin-responsive means being adapted to be actuated for different intervals of time by coins in the respective different passages, means coupling the coin-responsive means and said shiftable means to move the latter into engagement with said auxiliary driver as long as the coin-responsive means is actuated by a coin, means controlled by the movement of the shiftable means and connected to the coin deflectors whereby a number of said deflectors are moved into deflecting position when the shiftable means is shifted a maximum, and whereby less than said number of the coin deflectors will be moved into coin-deflecting position for less than maximum shift of the shiftable means.

13. Coin apparatus comprising means providing several different coin passages for receiving different coins respectively, the coins being of different denominations, said passages respectively having inlets, coin-driving means spaced from the inlets for driving through each respective passage any coin therein, a motor for said coin-driving means and including a circuit, a switch in said circuit and responsive to initial movement of a coin in any passage to start the motor and consequently the coin-driving means, individual coin deflectors for the respective passages ahead of said coin-driving means, a driving gear movable with the coin-driving means and also driven by said motor, shiftable means including a rack movable into engagement with the driving gear but being normally disengaged therefrom, coin-responsive means responsive to movements of any coin traversing any passage but differentiating in length along the length of each passage to respond for different times to coins of different denominations in the respective passages, means coupling the coin-responsive means and said shiftable means to move its rack into engagement with said gear as long as the coin-responsive means responds to a coin, means controlled by the movement of the shiftable means and connected to the coin deflectors whereby all of said deflectors are moved into deflecting position when the shiftable means is shifted a maximum, and whereby less than all of the coin deflectors will be moved into coin-deflecting position for less than maximum shift of the shiftable means.

14. Coin apparatus comprising means providing three passages for respectively receiving coins of 25¢, 10¢ and 5¢ denominations, said passages respectively having inlets, coin-driving means spaced from the inlets for driving through each respective passage a coin of the respective denomination placed in the passage, means responsive to initial movement of any coin in any passage to start the coin-driving means, three coin deflectors each respectively for a passage and located ahead of said coin-driving means, an auxiliary driver movable with the coin-driving means, shiftable means movable into engagement with the auxiliary driver to be driven and shifted but being normally disengaged from said driver, coin-responsive means responsive to movements of any coin being driven in any passage but differentiating in length along the length of each passage so as to respond for a unit length of time to a coin of 5¢ denomination, for two units of time in response to a coin of 10¢ denomination, and for five units of time for a coin of 25¢ denomination, means coupling the coin-responsive means and said shiftable means to move the latter into engagement with said auxiliary driver as long as the coin-responsive means responds to a coin, means controlled by the movement of the shiftable means and connected to the coin deflectors whereby one deflector is moved into the passage for the coins of 25¢ denominations when the shiftable means is shifted a distance corresponding to a coupling period of one unit of time, a second deflector is additionally shifted into the passage for coins of 10¢ denominations when the shiftable means is shifted a distance corresponding to a coupling period of four units of time, and whereby a third deflector is additionally shifted into the passage for coins of 5¢ denominations when the shiftable means is shifted a distance corresponding to a coupling period of five units of time.

15. Coin apparatus comprising means providing two passages for respectively receiving coins of 10¢ and 5¢ denominations, said passages respectively having inlets, coin-driving means spaced from the inlets for driving through each respective passage a coin of the respective denomination placed in the passage, means responsive to initial movement of any coin in either passage to start the coin-driving means, two coin deflectors with one for each of said passages and located ahead of said coin-driving means, an auxiliary driver movable with the coin-driving means, shiftable means movable into engagement with the auxiliary driver to be driven and shifted but being normally disengaged from said driver, coin-responsive means responsive to movements of a coin traversing either passage but differentiating in length along the length of each passage so as to respond for a unit length of time to each coin of 5¢ denomination, and for two units of time in response to a coin of 10¢ denomination, means coupling the coin-responsive means and said shiftable means to move the latter into engagement with said auxiliary driver as long as the coin-responsive means responds to coin movement, means controlled by the movement of the shiftable means and connected to the coin deflectors whereby one deflector is moved into the passage for the coins of 10¢ denominations when the shiftable means is shifted a distance corresponding to a coupling period of a predetermined number of units of time, and a second deflector is additionally shifted into the passage for coins of 5¢ denominations when the shiftable means is shifted a distance corresponding to a coupling period of an additional unit of time.

16. Coin apparatus comprising means providing four passages for respectively receiving coins of 25¢, 10¢, 5¢ and 1¢ denominations, said passages respectively having inlets, coin-driving means spaced from the inlets for driving through each respective passage a coin of the respective denomination in the passage, means responsive to initial movement of any coin in any passage to start the coin-driving means, three coin deflectors with one for each respective 25¢, 10¢ and 5¢ passage ahead of said coin-driving means, an auxiliary driver movable with the coin-driving means, a first and a second shiftable means movable into engagement with the auxiliary driver to be driven and shifted but being normally disengaged from said driver, a first coin-responsive means responsive to movements of any coin traversing any 25¢, 10¢ or 5¢ passage but differentiating in length along the length of each passage so as to respond for a unit length of time to each coin of 5¢ denomination, for two units of time in response to a coin of 10¢ denomination, and for five units of time for a coin of 25¢ denomination, a first coupling means for the first coin-responsive means and said first shiftable means to move the latter into engagement with said auxiliary driver as long as the coin-responsive means responds to coin movement, means controlled by the movement of the shiftable means and connected to the coin deflectors whereby one deflector is moved into the passage for the coins of 25¢ denominations when the shiftable means is shifted a distance corresponding to a coupling period of one unit of time, a second deflector is additionally shifted into the passage for coins of 10¢ denominations when the shiftable means is shifted a distance corresponding to a coupling period of four units of time, and whereby a third deflector is additionally shifted into the passage for coins of 5¢ denominations when the shiftable means is shifted a distance corresponding to a coupling period of five units of time, a second coin-responsive means responsive to movements only of a coin of 1¢ denomination and a second coupling means for the second coin-responsive means and the second shiftable means to move the latter into engagement with said auxiliary driver as long as the second coin-responsive means responds to movement of a coin of 1¢ denomination.

17. Coin apparatus comprising means providing multiple passages for respectively receiving different coins of unit denomination and multiples thereof, said passages respectively having inlets, coin-driving means spaced from the inlets for driving a coin through each respective passage, means responsive to initial movement of any coin in any passage to start the coin-driving means, coin deflectors with one for each respective passage ahead of said coin-driving means, an auxiliary driver movable with the coin-driving means, shiftable means movable into engagement with the auxiliary driver to be driven and shifted but being normally disengaged from said driver, coin-responsive means actuated by any coin traversing any passage, said coin-responsive means being adapted to be actuated for a unit length of time by each coin of unit denomination, and for corresponding multiple units of time in response to coins of corresponding multiple denominations, means coupling the coin-responsive means and said shiftable means to move the latter into engagement with said auxiliary driver as long as the coin-responsive means is actuated by a coin, means controlled by the movement of the shiftable means and connected to the coin deflectors whereby one deflector is moved into the passage for the coins of said unit denomination when the shiftable means is shifted a distance corresponding to a coupling period of multiple units of time, and a second deflector is shifted into the passage for coins of multiple denomination when the shiftable means is shifted a distance corresponding to a coupling period of one unit of time.

18. Coin - controlled apparatus comprising means forming a coin chute, coin-driving means associated with said chute adapted to drive a coin through a portion of the chute, motivating means for the driving means, means responsive to movement of a coin through the chute toward said driving means adapted to start said motivating means, a gear driven by the motivating means, a rack bar adapted for a longitudinal movement by and some swinging movement to and from mesh with the gear, means actuated by a coin driven by the driving means adapted to swing the rack bar into mesh with said gear for a substantially predetermined period of time, and means operative after said predetermined time of mesh for stopping said motivating means.

19. Coin - controlled apparatus comprising means forming a coin chute, coin-driving means associated with a portion of said chute adapted to drive coins along said portion, a primary interceptor associated with the chute ahead of said driving means and adapted to be moved by a coin from an initial intercepting position in the chute to a non-intercepting position, means controlled by said primary interceptor adapted to actuate said driving means when said primary interceptor moves to its non-intercepting position, a secondary interceptor associated with the chute ahead of said primary interceptor and movable between an initial non-blocking position and a chute-blocking position, means controlled by said primary interceptor for moving said secondary interceptor to its chute-blocking position upon movement of said primary interceptor to its non-intercepting position, a third interceptor associated with said chute adjacent the driving means and adapted to be moved away from an initial intercepting position by a coin driven by the driving means, means controlled by said third interceptor upon such movement thereof to return said primary and secondary interceptors to their initial positions and to stop said driving means, registering means including an interceptor in said chute adjacent said driving means but ahead of said third interceptor and responsive to movement of a coin by the driving means to effect a registration, and ejecting means located in association with the chute ahead of said secondary interceptor and adapted to be operated by said registering means after certain coins have passed through the chute.

20. In apparatus of the class described, a coin chute, means associated with the chute for engaging and moving a coin along a portion of the chute, means for driving said coin-moving means, means actuated by a coin progressing toward said coin-moving means in the chute for starting said driving means, a movable coin-registering member adapted to be driven to effect a registration during the time that the coin-moving means drives a coin, means for coupling said driving means to said registering member to drive it including a device engaged and actuated by the coin being moved by said coin-moving means, said device being of a predetermined length along the length of the chute, whereby said registering member is moved proportionally to the length of time that a coin engages and actuates said device, and means actuated by a coin moving away from said coin-moving means in said chute for stopping said driving means.

21. In apparatus of the class described, a plurality of coin chutes for respectively receiving coins of different denominations, means associated with the chutes for engaging and moving a coin along a portion of each chute, means for driving said coin-moving means, means actuated by a coin progressing toward said coin-moving means in any chute for starting said driving means, a movable coin-registering member adapted to be driven to effect a registration during the time that the coin-moving means drives a coin, means for coupling said driving means to said registering member to drive it including devices engaged and actuated by coins being moved by said coin-moving means, said devices being of different lengths along the length of the respective chutes so as to be actuated for different lengths of time by coins in the different chutes, and means actuated by any coin in moving away from said coin-moving means for stopping said driving means.

22. In apparatus of the class described, a coin chute, means associated with the chute for engaging and moving a coin along a portion of the chute, means for driving said coin-moving means, a movable coin-registering member adapted to be driven to effect a registration during the time that the coin-moving means drives a coin, and means for coupling said driving means to said registering member to drive it including a device engaged and actuated by the coin being moved by said coin-moving means, said device being of a predetermined length along the length of the chute, whereby said registering member is moved proportionally to the length of time that a coin engages and actuates said device.

23. In apparatus of the class described, a plurality of coin chutes for respectively receiving coins of different denominations, means associated with the chutes for engaging and moving a coin along a portion of each chute, means for driving said coin-moving means, a movable coin-registering member adapted to be driven to effect a registration during the time that the coin-moving means drives a coin, and means for coupling said driving means to said registering member to drive it including devices engaged and actuated by coins being moved by said coin-moving means, said devices being of different lengths along the lengths of the respective chutes so as to be actuated for different lengths of time by coins in the different chutes.

BENJAMIN W. FRY.

REFERENCES CITED

The following references are of record in the file of this patent:

UNITED STATES PATENTS

| Number | Name | Date |
| --- | --- | --- |
| 2,285,532 | Rockola | June 9, 1942 |